3,585,022
GRANULAR BIOLOGICALLY ACTIVE COMPOSITIONS AND METHODS OF MAKING THE SAME
Harvey C. Gray, Jr., Jacksonville, Fla., assignor to Kerr-McGee Chemical Corp., Oklahoma City, Okla.
No Drawing. Filed June 9, 1967, Ser. No. 644,824
Int. Cl. A01n 5/00, 9/00
U.S. Cl. 71—65
7 Claims

ABSTRACT OF THE DISCLOSURE

A granular biologically active material in the form of a crystalline salt containing water of crystallization and a biologically active material within the crystal lattice and a method of making such material by the steps of admixing a biologically active material with a crystalline salt containing water of crystallization, compressing under a pressure sufficient to release the water of crystallization and decompressing the mixture to recombine the water with the salt and form a dry, homogeneous mass.

This invention relates to granular biologically active compositions and methods of making the same and particularly to granular pesticidal and herbicidal compositions and the like for use in controlling undesirable pests. In this specification, the terms "biologically active" or "pesticidal" compositions are meant to include those compositions which are effective in controlling and/or killing insects, plants, rodents, micro-organisms, fungi and the like and includes those compositions commonly referred to as insecticides, herbicides, rodenticides, fungicides, nematocides, etc.

Pesticidal compositions in various forms are available for rather diverse methods of application. Methods of preparation presently used are determined largely by the physical and chemical nature of the biologically active agent and the intended use and method of application of this agent to the area to be treated. One method commonly used is the dissolution of the desired pesticide in a suitable solvent or solvents with or without the addition of emulsifying agents, wetting agents, etc. With the subsequent extension of the pesticidal solution with solvents or water to dilute to proper concentration for application to the desired area. Also the pesticidal agent may be mixed with a dry pulverulent diluent such as finely ground fuller's earth, diatomaceous earth montmorillonite, kaolinite, talc, limestone, etc. These methods produce materials which are suitable for application with both airborne and mobile ground equipment. However, with both classes of material there is always present the hazard that the finely divided particles of active spray or dust may be carried by air currents into areas where harmful effects may occur. In addition, it is difficult to apply sprays or dusts to the soil surface or to lower areas of plants when dense foliage must be penetrated.

In order to overcome some of the inherent difficulties involved in using sprays or dusts, methods have been developed to produce pesticidal compositions in the form of granules. One such method is the impregnation of a liquid pesticide or a solution of a solid pesticide in a preformed granule consisting essentially of an absorbent natural clay such as fuller's earth or manufactured products such as calcined diatomaceous earth. This technique lends itself to the manufacture of pesticidal compositions in which the active ingredient exists normally as a nonvolatile liquid. However, in the preparation of such granules containing pesticides which normally exist as solids, it becomes necessary to dissolve the pesticide in a suitable solvent and subsequently impregnate the granules with the resulting solution. Since the solvents used are not normally considered as a part of the active ingredients of the composition, their use creates an additional expense. In addition, some solvents used are volatile and are removed naturally or artificially before the granules are ready for use. Other solvents which remain as a part of the finished formulation exhibit undesirable traits such as flammability and varying degrees of undersirable toxic effects upon plants or animals.

Another method used for the preparation of granular pesticidal compositions is the technique of coating a preformed granule with a normally solid toxicant or a liquid toxicant which has been adsorbed or absorbed onto or into a suitable finely divided carrier such as fuller's earth, diatomaceous earth, kaolinite or a manufactured finely divided adsorbent carrier such as calcium silicate. These solid coatings are made to adhere to the granules with the aid of natural or artificial bonding agents. The finished granules so formed have the disadvantage of having all the active pesticidal ingredients on the granules surface where it can be removed by attrition or abrasion thereby creating a product with varying composition in the various particle sizes normally present in the finished product. Additionally, this type of formulation is normally limited to the lower concentration ranges; i.e., 10% or less of active pesticidal ingredient in the finished product.

Still another method used for the preparation of granular pesticidal compositions, particularly those which normally exist as solids, is accomplished by mixing the finely divided active ingredient with a suitable diluent such as fuller's earth, adding a binding agent such as anhydrous calcium sulfate and pelletizing or granulating the resulting mixture by the addition of water while keeping the mixture in constant motion with the aid of a suitable granulation device such as a balling (granulating) drum or pan. The excess moisture is then evaporated and the product reduced to the desired particle size range by screening and crushing operations.

This method of preparation produces homogenous granules with many desirable properties but it has the disadvantage of having excess moisture which must be removed, usually with the aid of heat. This combination of elevated temperatures in the presence of moisture causes the accelerated decomposition of some pesticidal compositions (for example, Carbaryl). Typical of these previous practices are the practices set out in U.S. Pats. 3,028,305; 2,821,500; 3,137,618 and 3,056,723.

I have invented a biologically active granular composition and method of making the same which eliminates these problems of the prior art practices and eliminates the need for solvents with their attendant disadvantages. By my method, I provide a granular composition which is homogeneous and therefore not destroyed by attrition and which is free of any undesirable solvent residues.

Preferably, I provide a crystalline salt containing water of crystallization having a biologically active material within the crystal lattice.

Preferably, in the method of my invention, I form a mixture of a pesticidal or biologically active material in powdered form with a crystalline salt containing water of crystallization which may be released under pressure, such as Epsom salts; subject the mixture to pressure to release the water of crystallization to form a cohesive mass and release the pressure to provide a crystalline mass in which the pesticidal or biologically active material is held in the resulting crystal structure.

The particles which result from this practice may be crushed and screened if desired to produce any size range of particles which may be necessary. Any particles which are too small to be of use as granules or which are smaller than the desired size range may be returned to the original mixture and recycled through the entire procedure until the desired particle size range is accomplished. In addition to the pesticidal material and the crystalline salt, other materials may be added to the formulation to reduce cost or to vary the properties of the finished product. Such diluents as fuller's earth may be incorporated and also binding materials such as dextrine, bentonite or lignosulfonates may be added to increase the hardness of the granules and vary the rate of disintegration of the granules when in contact with moisture.

In a typical practice of my invention, 30 to 90 parts by weight of crystalline salt with water of crystallization, e.g., Epsom salts ($MgSO_4 \cdot 7H_2O$) are mixed with 10 to 60 parts by weight of a finely divided concentrate of the desired pesticide or biologically active material (preferably of 25% to 100% concentration), subjected to pressure and released, screened, crushed and screened or otherwise treated to select the desired size range. In addition 0 to 50 parts by weight of an inert diluent such as fuller's earth, kaolin, limestone, etc. may be incorporated as may also 0 to 20 parts by weight of binders such as bentonite, lignosulfonate, dextrine, etc. may be added prior to compressing. Other materials such as wetting agents may be added if desired.

Preferably, the mixture is compressed into a cohesive mass with an extrusion process, a ring-die type pellet mill or other suitable compaction apparatus. The resulting pellets, flakes, etc., may subsequently be screened to obtain granules of a desired size range, usually between 8 and 60 mesh (U.S. Standard Sieve Series). Usually granules will be screened such that one of the following will be chosen: The portion which passes an 8 mesh sieve and be retained on a 20 mesh sieve; the portion which passes a 15 mesh sieve and be retained on a 30 mesh sieve; the portion which passes a 20 mesh sieve and will be retained on a 40 mesh sieve. Granules which are larger than the desired size may be reduced by crushing or grinding and particles smaller than the desired size range may be recycled through the process to make larger granules. No drying of the product is necessary.

The present invention is illustrated but not limited by the following examples:

EXAMPLE 1

A mixture was made containing 25 parts by weight of 80% Sevin wettable powder and 75 parts by weight of fine crystals of Epsom salts ($MgSO_4 \cdot 7H_2O$). This mixture was fed to a ring-die type pellet mill where it is compressed into pellets approximately ⅛ inch in diameter and ¼ to ½ inch long. The resulting pellets were crushed in a roller mill and screened to obtain a granular product which will pass through a 15 mesh sieve and be retained on a 30 mesh sieve. The granules were hard and resist abrasion but disintegrate readily in the presence of moisture.

EXAMPLE 2

The procedure as in Example 1 was repeated using 80% diuron wettable powder instead of 80% Sevin. Similar results are obtained.

EXAMPLE 3

The procedure as in Example 1 was repeated using 80% dieldrin dust instead of Sevin 80% wettable powder. Results were similar.

EXAMPLE 4

A mixture was made containing 50 parts by weight Sevin 80% dust and 50 parts by weight Epsom salts. This mixture was compressed in a ring-die type pellet mill to produce pellets ³⁄₁₆ inch in diameter and ¼ to ¾ inch long. The resulting pellets were crushed in a roller mill and screened to obtain a granular product which will pass through a 20 mesh sieve and be retained on a 40 mesh sieve. The granules were hard and resist abrasion but disintegrate readily in the presence of moisture.

EXAMPLE 5

A mixture was made containing 25 parts by weight Sevin 80% dust, 50 parts by weight fine crystalline Epsom salts ($MgSO_4 \cdot 7H_2O$), 5 parts by weight bentonite, 20 parts by weight fuller's earth. The resulting mixture was compressed in a ring-die type pellet mill to form pellets ³⁄₃₂ inch in diameter and ¼ to ½ inch long. These pellets were crushed and screened to produce a granular product which passes a 15 mesh sieve but is retained on a 30 mesh sieve. The resulting pellets were hard, resist being broken or abraded into smaller subdivisions by normal handling and yet disintegrate readily in the presence of moisture.

EXAMPLE 6

The method described in Example 5 in which the Sevin 80% dust was replaced with diuron 80% wettable powder and the Epsom salts were replaced with sodium tetraborate.$10H_2O$.

EXAMPLE 7

The method described in Example 5 in which one-half the Epsom salts were replaced with $Na_2SO_4 \cdot 7H_2O$.

EXAMPLE 8

A mixture of the composition 40 parts by weight DDT 50% dust, 50 parts by weight sodium acetate ($3H_2O$) and 10 parts by weight bentonite was compressed in a ring-die type pellet mill to form pellets ³⁄₃₂ inch in diameter and ¼ to ½ inch long. The pellets were crushed and screened to produce a granular product passing a 15 mesh sieve and retained on a 30 mesh sieve. The pellets were well formed and relatively soft.

EXAMPLE 9

The practice of Example 8 was followed using the composition 40 parts by weight 50% dieldrin dust, 50 parts by weight sodium citrate ($2H_2O$) and 10 parts by weight bentonite. The pellets were hard and readily crushed and screened for desired particle size.

EXAMPLE 10

The practice of Example 8 was followed using a composition of 40 parts by weight 25% Malathion dust, 50 parts by weight sodium citrate ($2H_2O$) and 10 parts by weight attapulgite clay. Produces hard pellets as in Example 9 above.

EXAMPLE 11

The practice of Example 8 was followed using the composition 30 parts by weight copper sulfate ($5H_2O$), 30 parts by weight kaolin clay, 30 parts by weight magnesium sulfate ($7H_2O$) and 10 parts by weight bentonite. An algaecide or plant nutrient was produced in the form of hard pellets as in Example 9 above.

EXAMPLE 12

The practice of Example 8 was carried out using the composition 25 parts ferrous sulfate ($7H_2O$), 25 parts magnesium sulfate ($7H_2O$) and 50 parts aldrin 40% dust. Relatively hard pellets as in Example 9 were produced.

EXAMPLE 13

The practice of Example 8 was followed using 50 parts nickelous sulfate ($6H_2O$) and 50 parts calcium arsenate. Hard pellets as in Example 9 were produced.

EXAMPLE 14

The practice of Example 8 was followed with the composition 80 parts chromium sulfate ($18H_2O$) and 20 parts montmorillonite clay. Hard pellets as in Example 9 were produced suitable for crushing and screening to size.

EXAMPLE 15

The practice outlined in Example 8 was carried out with the composition 25 parts barium hydroxide ($8H_2O$), 25 parts lead acetate ($10H_2O$), 25 parts copper sulfate ($5H_2O$) and 25 parts attapulgite clay. The product was a relatively hard pellet as in Example 9.

EXAMPLE 16

The practice of Example 8 was used on 30 parts sodium ammonium phosphate, ($4H_2O$), 30 parts cobalt sulfate ($18H_2O$), 30 parts attapulgite clay and 10 parts bentonite. A hard pellet was formed as in Example 9.

EXAMPLE 17

The practice of Example 8 was followed with a composition of 30 parts aluminum sulfate ($18H_2O$), 30 parts magnesium sulfate ($7H_2O$) and 40 parts lindane 50% dust. The product was a hard pellet as in Example 9.

EXAMPLE 18

The practice of Example 8 was applied to a composition of 30 parts aluminum potassium sulfate ($24H_2O$), 30 parts magnesium sulfate ($7H_2O$), 20 parts copper aceto arsenite and 20 parts attapulgite clay. A hard pellet was produced as in Example 9.

EXAMPLE 19

The practice of Example 8 was used on a composition of 30 parts ferric sulfate ($9H_2O$), 30 parts magnesium sulfate ($7H_2O$), 25 parts diuron 80% wettable powder, 5 parts starch and 10 parts attapulgite clay. The product was a hard pellet as in Example 9.

EXAMPLE 20

The practice of Example 8 was followed using the composition of 30 parts ferrous sulfate ($7H_2O$), 30 parts manganous sulfate ($4H_2O$), 30 parts sulfur dust and 10 parts bentonite. A hard pellet as in Example 9 was produced.

EXAMPLE 21

The practice of Example 8 was applied to the composition 40 parts sodium tetraborate ($10H_2O$), 50 parts BHC dust (24% gamma isomer) and 10 parts aluminum sulfate ($18H_2O$). Again a hard pellet was produced as in Example 9.

While I have illustrated my process in connection with certain biologically active materials, it is capable of use with any such material as for example the following materials:

O,O-dimethyl phosphorothioate O,O-diester with 4,4'-thiodiphenol acrylonitrile
1,2,3,4,10,10-hexachloro-1,4,4a,5,8,8a-hexahydro-1,4-endoexo-5,8-dimethanonaphthalene
aluminum phosphide
O,O-dimethyl phosphorodithioates-ester with 3-(mercaptomethyl)-1,2,3-benzotriazin-4 (3H)-one
1,2,3,4,5,6-hexachlorocyclohexane
calcium arsenate
calcium cyanide
1-naphthyl methylcarbamate
trichloronitromethane
O,O-diethyl O-(3-chloro-4-methyl-2-oxo-2H-1-benzopyran-7-61)phosphorothioate
sodium hexafluoroaluminate
1,1,1-trichloro-2,2-bis(p-chlorophenyl) ethane
4,4'-dichloro-alpha-(trichloromethyl) benzhydrol
1,2,3,4,10,10-hexachloro-6,7-epoxy-1,4,4a,5,6,7,8,8a-octahydro-1,4-endo-exo-5,8-dimethanonaphthalene
O,O-dimethyl S-(N-methylcarbam-oylmethyl) phosphordithioate
2-sec-butyl-4,6-dinitrophenol
4,6-dinitro-o-cresol
2-cyclohexyl-4,6-dinitrophenol
p-dioxane-2,3-diyl ethyl phosphorodithioate
diphenylamine
dicyclohexylamine salt of 2-cyclohexyl-4,6-dinitrophenol
6,7,8,9,10,10-hexachloro-1,5,5a,6,9,9a-hexahydro-6,9-methano-2,4,3-benzodioxathiepin 3-oxide
1,2,3,4,10,10-hexachloro-6,7-epoxy-1,4,4a,5,6,7,8,8a-octahydro-1,4-endo-endo-5,8-dimethanonaphthalene
O-ethyl O-p-nitrophenyl phenylphosphonothioate
O,O,O',O'-tetraethyl S,S'-methylenebisphosphorodithioate
O,O-dimethyl O-(4-(methylthio)-m-tolyl) phosphorothioate
2,4-dichlorophenyl benzenesulfonate
1,4,5,6,7,8,8-heptachloro-3a,4,7,7a-tetrahydro-4,7-methanoindene
decachlorooctahydro-1,3,4-metheno-2H-cyclobuta (cd)-pentalen-2-one
acid lead arsenate
1,2,3,4,5,6-hexachlorocyclo-hexane, gamma isomer
S-(1,2-bis(ethoxycarbonyl)ethyl) O,O-dimethyl phosphorodithioate
metaldehyde
1,1-trichloro-2,2-bis(p-methoxyphenyl) ethane
O,O-dimethyl O-p-nitrophenyl phosphorothioate
S-((p-chlorophenyl) thio methyl) O,O-dimethyl phosphorodithioate
decachlorooctahydro-1,3,4-metheno-2H-cyclobuta (cd)-pentalene
6-methyl-2,3-quinoxalinedithiol cyclic S,S-dithiocarbonate
1,2-dibromo-2,2-dichloroethyl dimethyl phosphate
naphthaline
O-2,4-dichlorophenyl O,O-diethyl phosphorothioate
nicotine sulfate
p-chlorophenyl p-chlorobenzene-sulfonate
p-dichlorobenzene
O,O-diethyl O-p-nitrophenyl phosphorothioate
copper acetoarsenite
1,1-dichloro-2,2-bis(p-ethylphenyl) ethane (95 percent) and related reaction products (5 percent)
O,O-diethyl S-(ethylthio) methyl phosphorodithioate
rotenone—the primary active compound of derris and cube roots
4-tert-butyl-2-chlorophenyl methyl methylphosphoramidate
ryania—powdered stemwood of Ryania speciosa
sabadilla—ground seeds of sabadilla containing veratrine, a complex mixture of alkaloids
Strobane-terpene polychlorinates (65 percent chlorine)
sulfur
p-chlorophenyl phenyl sulfone
1,1-dichloro-2,2-bis(p-chlorophenyl)-ethane
Telone-mixed dichloropropenes
p-chlorophenyl-2,4,5-trichlorophenyl sulfone
isobornyl thiocyanoacetate
chlorinated camphene containing 67–69 percent chlorine (toxaphene)
dimethyl(2,2,2-trichloro-1-hydroxyethyl) phosphonate
4-(dimethylamino)-3,5-xylyl methylcarbamate
acid lead arsenate
amino-1,2,4-triazole
ammonium methyl arsonates
arsenic trioxide
basic lead arsenate
bromo-3-isopropyl-6-methyl uracil
bromo-3-sec. butyl-6-methyl uracil
calcium arsenate
calcium cyanamide
calcium acid methyl arsenate
calcium propyl arsenate
2-chloroallyl diethyldithio carbamate
4-chloro-2-butynyl-n-(3-chlorophenyl) carbamate
2-chloro-4.6-bis (ethylamino)-s-triazine
2-chloro-4-ethylamino-6-isopropylamino-s-triazine
2-chloro-4.6-bis(isopropylamino)-1,3,5-triazine
3-(p-chlorophenyl)-1,1-dimethyl urea 3-(p-chlorophenyl)-1,1-dimethylurea trichloroacetate
2,4-dichlorophenoxyacetic acid
2,3-dichlorallyl diopropylthio carbamate
3-(3,4-dichlorophenyl)-1-dimethylurea-N-(3,4-dichlorophenyl) methacrylamide
N-(3,4-dichlorophenyl) methacrylamide
dimethyl arsinic acid
disodium methyl arsenate
isopropyl N-(3-chlorophenyl) carbamate
isopropyl N-phenyl carbamate
methanearsonic acid
2-methyoxy-4,6-bis(isopropylamino)-s-triazine
2-methoxy-3,6-dichlorobenzoic acid
2-methyl-4-chlorophenoxy acetic acid
monosodium acid methylarsonate
methyl-N-(3,4-dichlorophenyl) carbamate
pentachlorophenol
3-phenyl-1,1-dimethyl urea
3-phenyl-1,1-dimethylurea trichloroacetate
phenyl mercuric acetate
potassium cyanate
potassium permanganate
potassium thiocyanate
N-propyl-di-N-propylthiolcarbamate
N-propyl ethyl-N-butylthiocarbamate
sodium arsenate I have set out certain preferred practices and embodiments of my invention in the foregoing specification, however, it will be understood that this invention may be otherwise embodied within the scope of the following claims.

I claim:
1. The method of making a granular pesticidally active composition comprising the steps of:
    (a) admixing a biologically active material with a crystalline salt containing water of crystallization,
    (b) compressing said mixture under pressure sufficient to release the water of crystallization from said salt to form a cohesive mass with the pesticidally active material, and
    (c) decompressing the mixture to recombine the water with the salt and form a dry homogenous mass.
2. The method of making a granular biologically active material as claimed in claim 1 wherein the product is crushed and screened to a selected product size and the undersized material is recycled through the process steps.
3. The method claimed in claim 1 wherein the biologically active material is an insecticide.
4. The method claimed in claim 1 wherein the biologically active material is a herbicide.
5. The method as claimed in claim 1 wherein the crystalline salt is hydrated magnesium sulfate

$$(MgSO_4 \cdot 7H_2O)$$

6. The method as claimed in claim 1 wherein a portion of the crystalline salt is replaced with one of a clay diluent and a binding agent.
7. The method as claimed in claim 5 wherein the final granules formed are crushed to a particle size that will pass through an 8 mesh sieve and be retained on a 60 mesh sieve.

References Cited
UNITED STATES PATENTS 2,992,090  7/1961  Littler _____ 71—A.D

FOREIGN PATENTS 6608931  12/1967  Netherlands _____ 71—A.D

JAMES O. THOMAS, JR., Primary Examiner

U.S. Cl. X.R.

71—67, 77, 79; 424—127, 167